United States Patent

McIntosh et al.

[15] 3,662,950
[45] May 16, 1972

[54] PRESSURE AND TEMPERATURE RELIEF VALVE

[72] Inventors: Harold A. McIntosh, 517 Floral Park Terrace, South Pasadena, Calif. 91030; Gordon K. Slocum, 7733 Corey Street, Downey, Calif. 90242; William D. Rattan, 14124 Oriza BA, Paramount, Calif. 90723

[22] Filed: Aug. 6, 1970
[21] Appl. No.: 61,577

[52] U.S. Cl. ........................... 236/92, 137/515.5, 137/522, 248/65, 251/367, 267/179
[51] Int. Cl. .................................................. G05d 27/00
[58] Field of Search .............. 236/92, 100; 137/522, 543.12, 137/515.5; 251/367; 267/179; 138/108, 113, 114; 248/65

[56] References Cited

UNITED STATES PATENTS

| 2,461,982 | 2/1949 | Horne | 236/92 X |
|---|---|---|---|
| 446,203 | 2/1891 | Cochennour et al. | 267/179 |
| 2,747,802 | 5/1956 | Kmiecik | 236/92 |
| 3,154,248 | 10/1964 | Fulton et al. | 236/92 X |
| 3,503,262 | 3/1970 | Staire | 236/100 |
| 3,366,128 | 1/1968 | Feinberg | 236/92 X |
| 2,161,284 | 6/1939 | Crowell | 137/543.13 X |

FOREIGN PATENTS OR APPLICATIONS

| 5,793 | 1/1896 | Great Britain | 137/522 |

Primary Examiner—William E. Wayner
Attorney—Anthony A. O'Brien

[57] ABSTRACT

A pressure and temperature relief valve including a T-shaped casing having an inlet port with an insert member secured therein having a conical wall forming a valve seat in a chamber communicating with the inlet port and an outlet port, a valve member cooperating with the valve seat and loosely attached with a valve stem extending through another port axially aligned with the inlet port, a bias spring mounted in compression between first and second retaining cups with the first retaining cup engaging an adjustment plug in the other port and the second retaining cup engaging the valve member, and a ball and swivel lever mechanism engaging the valve stem and the adjustment plug to permit manual opening of the pressure and temperature relief valve.

9 Claims, 5 Drawing Figures

Patented May 16, 1972 3,662,950

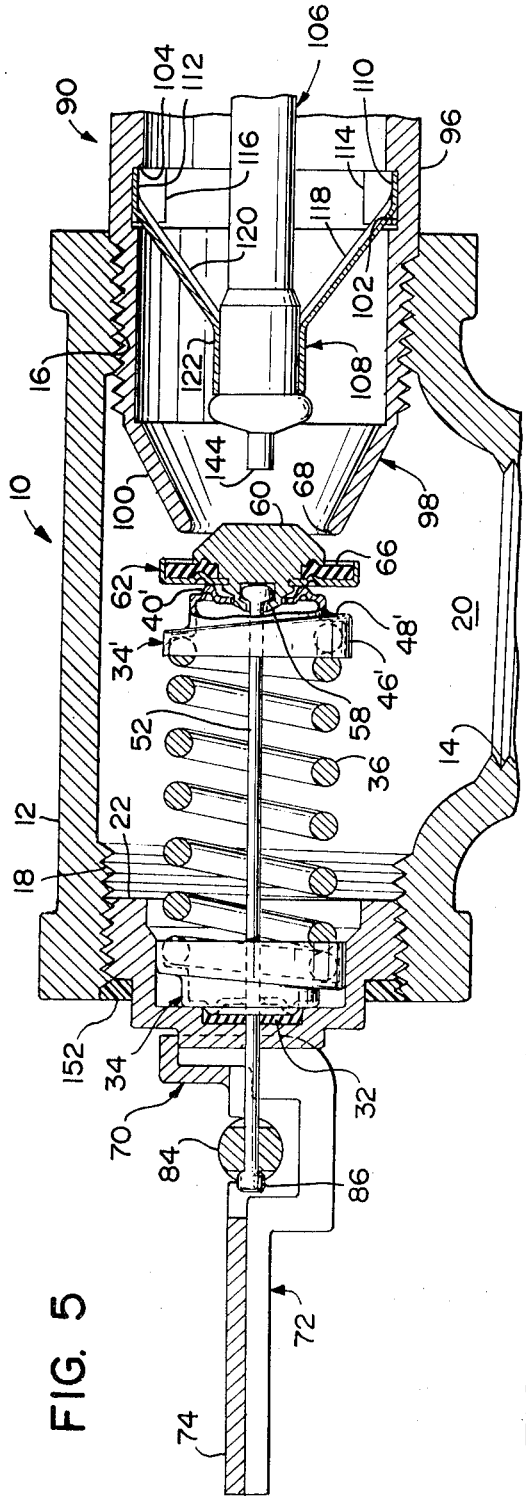
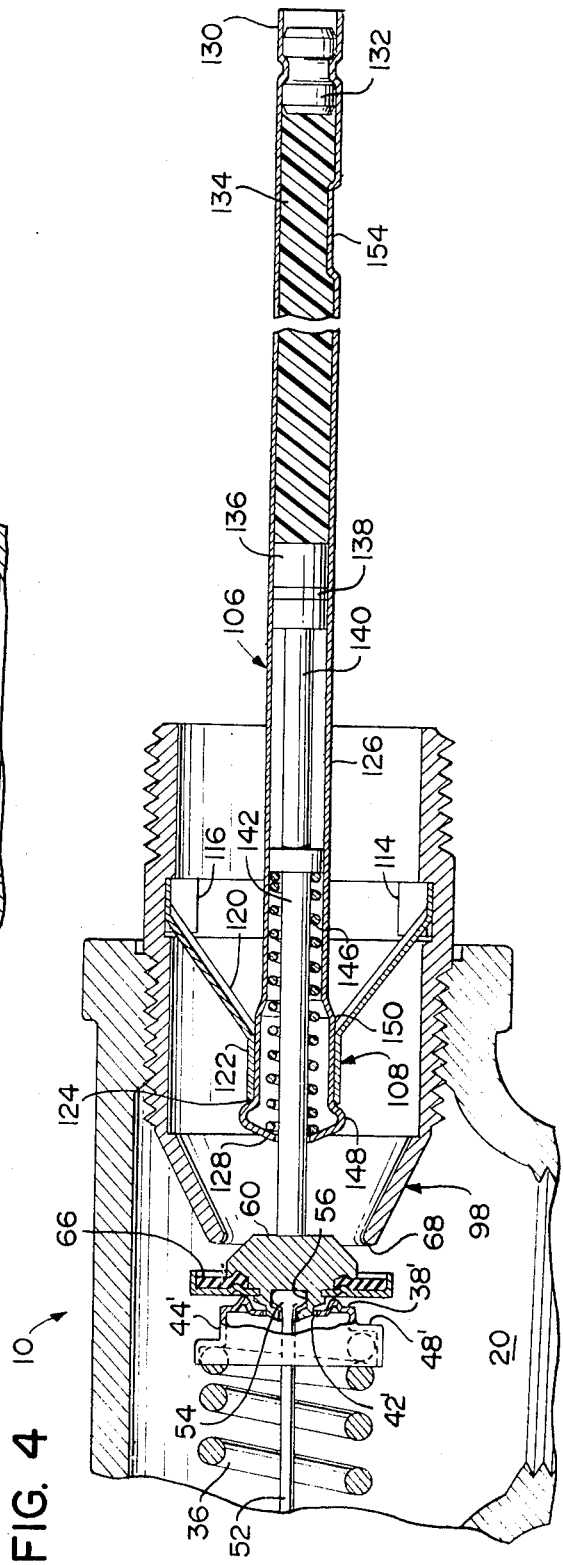
FIG. 5
FIG. 4

3,662,950

PRESSURE AND TEMPERATURE RELIEF VALVE

BACKGROUND OF THE INVENTION

1. Field of the Invention:

The present invention pertains to pressure and temperature relief valves and more particularly to such valves for use with water heaters.

2. Description of the Prior Art:

Pressure and temperature relief valves are commonly used with water heaters to prevent damage caused by high pressures or temperatures within the water heater. For instance, when the pressure in the water heater exceeds a predetermined high limit value the relief valve will open to drain hot water or steam from the water heater. The escape of the hot water or steam relieves the pressure within the water heater and maintains the pressure below the predetermined high limit value. In a similar manner, the relief valve maintains the water temperature in the water heater below a predetermined high limit value in response to a thermostat assembly which extends into the water heater to sense water temperature. The relief valve opens when the water temperature exceeds the predetermined high limit value to drain hot water or steam from the water heater and reduce the water temperature in the water heater.

Pressure and temperature relief valves of the prior art have the disadvantage of being relatively expensive in that the casings for the valves are specially designed and cast to provide a valve seat within a chamber in the casing. The expense of prior art pressure and temperature relief valves is also high due to the intricate assembly techniques required to properly insert and align the valve structure and the thermostat assembly within the valve casing. In the past if it was desired to decrease assembly costs without specially casting a single component casing, a casing was specially casted in two or more parts such that the valve structure and the temperature sensing temperature could be assembled and the parts of the casing secured together thereafter; however, this increases material cost with respect to the casing as well as requiring added labor to assemble the casing.

Other disadvantages of prior art pressure and temperature relief valves are that they are susceptible to misalignment adversely affecting calibration due to imprecise positioning of a bias spring, that levers utilized with such valves to permit manual opening thereof are subject to accidental disengagement, that the thermal elements utilized with such valves require additional components to assure axial alignment with the valve seat, and that costs are high due to increased numbers of components and assembly time in attempting to obviate the above disadvantages.

SUMMARY OF THE INVENTION

The present invention is generally summarized in a pressure and temperature relief valve including a casing having an inlet, an outlet and a chamber in communication therewith, an insert member secured in the inlet including register means and a wall forming a valve seat within the chamber, a valve member cooperating with the valve seat, a thermostat assembly controlling the valve member in response to temperature variations and positioned in the insert member by a retainer having clips engaged with the register means, and a helical bias spring mounted in compression and received in a retaining cup so as to rest on a helical shoulder therein and abut a stop therein, the retaining cup having a bottom portion engaging the valve member whereby the bias spring is aligned with the valve member.

It is a general object of the present invention to construct a pressure and temperature relief valve that may be inexpensively produced.

Another object of the present invention is to utilize a commercially available pipe Tee as a casing for a pressure and temperature relief valve.

A further object of the present invention is to provide a valve seat in a casing for a pressure and temperature relief valve by securing an insert member forming the valve seat in an inlet of the casing and to axially align a bias spring with the valve seat, a valve member and a valve stem by utilizing retaining cups having helical shoulders for receiving the ends of the bias spring.

The present invention has another object in that a ball and swivel arrangement is utilized to provide manual opening for a pressure and temperature relief valve.

Some of the advantages over the prior art are that the valve casing is commercially available and need not be cast, a valve seat is simply positioned in the casing by securing an insert member in a port thereof, proper valve seating and axial alignment of valve components are provided by the use of apertured spring retaining cups and material and assembly costs are greatly reduced.

Further objects and advantages of the present invention will become apparent from the following description of a preferred embodiment taken in conjunction with the accompanying drawings.

BRIEF DESCRIPTION OF THE DRAWINGS

FIG. 4 is an elevational view, partially in section, of the pressure and temperature relief valve of FIG. 1 when a high limit temperature is sensed.

FIG. 5 is an elevational view, partially in section, of the pressure and temperature relief valve of FIG. 1 after manual opening.

DESCRIPTION OF THE PREFERRED EMBODIMENT

Figure 1:
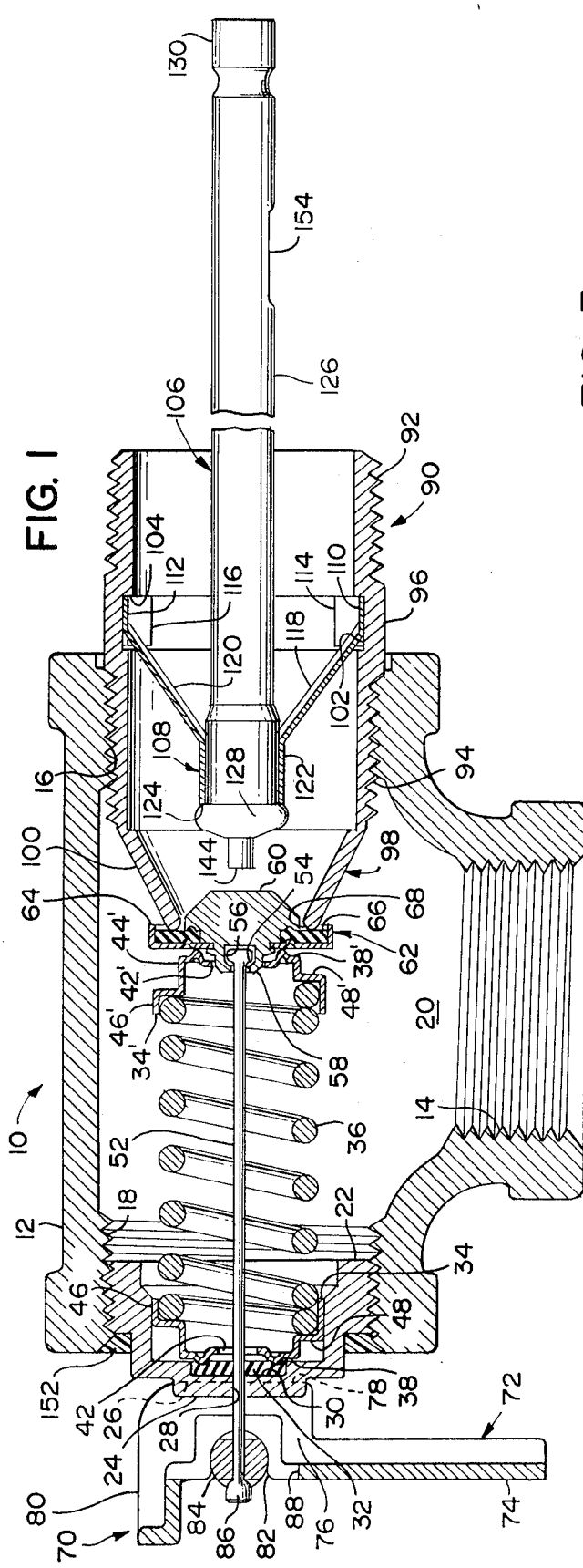
FIG. 1 is a broken sectional view of a pressure and temperature relief valve according to the present invention.

A pressure and temperature relief valve 10 according to the present invention is illustrated in FIG. 1 in its normally closed state when normal operating pressure and temperature conditions exist in a water heater, not shown. Valve 10 includes a casing 12 in the form of a standard, commercially available pipe Tee of galvanized cast iron. Casing 12 has an internally threaded outlet port 14, an internally threaded inlet port 16 and an internally threaded port 18 oppositely disposed and axially aligned with inlet port 16. A central chamber 20 communicates with inlet port 16 and outlet port 14, and outlet port 14 is adapted to be connected with a pipe leading to a drain to discharge steam and water from the water heater when valve 10 is opened.

A hollow, cylindrical, externally threaded adjustment plug 22, made of brass or steel, is screwed into port 18. Adjustment plug 22 has a round base 24 extending out of casing 12, and a slotted recess 26 is provided in base 24. A central aperture 28 extends through base 24 and communicates with an inner circular recess 30 in plug 22, and a rubber seal 32 is disposed in recess 30 and has a central aperture therethrough which is aligned with aperture 28. A spring retaining cup 34 is disposed in plug 22 and is internally threaded to receive an end of a helical bias spring 36 without the end being ground square. The other end of bias spring 36 is received in a spring retaining cup 34'.

Figure 2:
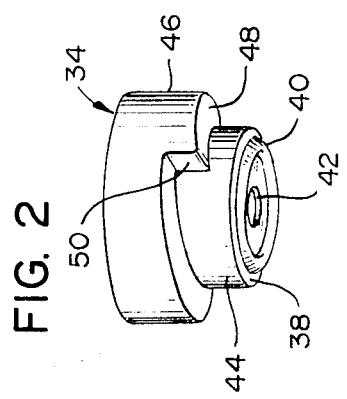
FIG. 2 is a perspective view of a spring retaining cup for use with the pressure and temperature relief valve of FIG. 1.

Spring retaining cups 34 and 34' are identical, and only cup 34 is described in detail with similar structure in cup 34' being given identical primed reference numerals. Retainer 34, as is best shown in FIG. 2, has a circular bottom 38 with an annular rib 40 therein centrally disposed about an aperture 42 which is aligned with aperture 28 and the aperture in seal 32 after assembly. Cup 34 has a cylindrical side wall 44 extending transversely from bottom 38, and side wall 44 has a widened portion 46 having a diameter corresponding to the outer diameter of bias spring 36. An angularly oriented shoulder 48 connects portion 46 with the smaller diameter portion of side wall 46, and shoulder 48 forms a stop 50 against which the end of bias spring 36 abuts after assembly.

A valve stem 52 has a bulbous head 54 at one end thereof captured in a cavity 56 in a neck portion 58 of a valve disc 60 which is part of a valve member generally indicated at 62. Cavity 56 is larger than head 54 to permit relative movement between valve member 62 and valve stem 52, and neck portion 58 fits loosely through aperture 42' in cup 34'. A cup-shaped plate 64 is received in an annular groove in valve disc 60 and has an outer surface engaging rib 40' of retaining cup 34'. A resilient annular valve face 66 rests on an annular shoulder of valve disc 60 and is securely positioned within plate 64 by means of a rib therein. The underside of valve face 66 cooperates with the arcuate end of an annular valve seat 68 to control flow through casing 12, and bias spring 36 is mounted in compression between retaining cups 34 and 34' to force valve member 62 into engagement with valve seat 68.

Valve stem 52 extends through aperture 42 in cup 34, the aperture in seal 32 and aperture 28 in plug 22 to a manual lever assembly, generally indicated at 70. Manual lever assembly 70 includes a lever 72 having an elongated handle 74 terminating in a pivot portion 76 having a bottom surface 78 and a side surface 80 extending transversely from bottom surface 78 and arcuately connected therewith. A spherical cavity 82 is provided in pivot portion 76 to receive a swivel ball 84 having a bore therethrough for receiving and capturing valve stem 52 by means of a bulbous head 86 thereon having a width greater than the bore. A slot 88 is provided in pivot portion 76 to permit pivotal movement of lever 72 to manually open the relief valve in a manner to be described hereinafter.

A generally cylindrical insert member 90 has an externally threaded nipple portion 92 which is adapted to threadedly engage an outlet of the water heater and an externally threaded shank 94 disposed above and separated from nipple portion 92 by an unthreaded ring 96 that is adapted to abut an outer edge of inlet port 16. Insert member 90 includes a valve seat portion 98 having a frusto-conical wall 100 extending inwardly from the upper edge of shank 94, and wall 100 has an arcuate open end defining valve seat 68. An annular register groove 102 is centrally disposed in ring 96, and the inner diameter of nipple portion 92 is smaller than the inner diameter of shank 94 to form a register shoulder 104 coinciding with the bottom of groove 102. Shank 94 is screwed into inlet port 16 of casing 12 such that valve seat 68 is positioned in central chamber 20 of the casing.

Figure 3:
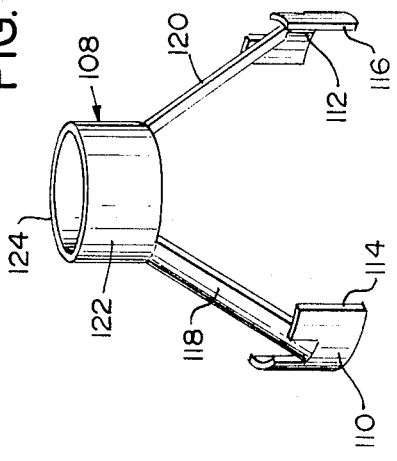
FIG. 3 is a perspective view of a thermostat assembly retainer for use with the pressure and temperature relief valve of FIG. 1.

A thermostat assembly 106 is held in position with respect to insert member 90 by means of a retainer 108 which has a pair of oppositely disposed clips 110 and 112 at the bottom thereof, which clips are inserted in register groove 102 and abut shoulder 104. As is illustrated in FIG. 3, clips 110 and 112 are similar and have curved legs 114 and 116, respectively. Legs 114 and 116 have a height commensurate with the width of groove 102, and clips 110 and 112 are spaced such that they are spring biased into groove 102 with legs 114 and 116 abutting the inner surface of the groove to prevent longitudinal movement of retainer 108. A pair of arms 118 and 120, which are U-shaped in cross section, extend inwardly from clips 110 and 112, respectively, to a centrally disposed, cylindrical collar 122 having an annular shoulder 124 at the top thereof.

Thermostat assembly 106 includes an elongated tubular housing 126 made of a heat conductive material, such as copper, and having an open end 128 and a sealed end 130 which is circumferentially crimped to capture a brass plug 132. A thermally responsive plastic material 134, such as polyethylene, is disposed in housing 126 to abut the inner face of plug 132 at a fixed end and to abut a silicone rubber plug 136 at a movable end. A washer 138 made of polytetrafluoroethylene is disposed between silicone plug 136 and a piston-like head of a spacer 140. The end of spacer 140 abuts a piston-like head of a plunger 142 which has an actuating end 144 extending through the open end 128 of tubular housing 126. A coiled bias spring 146 is mounted in compression between the piston-like head of plunger 142 and the inner surface of open end 128 which is rolled in to provide bulbous head 148 on which spring 146 seats and to reduce the opening in open end 128 to approximately the diameter of actuating end 144 of plunger 142 and acts as a guide therefor. The diameter of housing 126 is increased at 150 before being rolled in to form open end 128 and the outer diameter of the increased diameter portion 150 corresponds to the inner diameter of collar 122 of retainer 108 such that head 148 abuts shoulder 124 and collar 122 holds portion 150 to maintain the thermostat assembly in axial alignment with the valve assembly.

Thermally responsive plastic material 134 may be any plastic material which expands and contracts with increasing and decreasing temperatures, respectively. Such expansion and contraction may be linear or may involve a change of state as is the case with polyethylene which begins to change from a solid or crystalline state to a liquid or amorphous state at approximately 122° F. and completes the change of state at approximately 239° F. The slope of a curve of cubic expansion of polyethylene versus temperature is greatest between 200° and 210° F.; and, since this is the normal high limit temperature range for water heaters, polyethylene is an extremely desirable plastic material for sensing temperatures.

In order to assembly valve 10, insert member 90 is screwed into inlet port 16 to position valve seat 68 in chamber 20 in casing 12. Insert member 90 may be secured in port 16 by coating the threads of shank 94 with a retaining compound, such as Loctite. A subassembly of valve member 62, valve stem 52, retaining cups 34 and 34', bias spring 36, and plug 22 is completed and secured in casing 12 by screwing plug 22 into inlet 18. Plug 22 is adjusted in port 18 to apply a predetermined pressure on valve member 62 such that the force from spring 36 can be overcome only when the upstream pressure on valve member 62 reaches a predetermined value, and an epoxy fill 152 around plug 22 is utilized to maintain the calibrated position thereof. Lever 72 is placed over the end of valve stem 52, and swivel ball 84 is disposed in spherical cavity 82 in the lever to receive valve stem 52. Valve stem 52 is then captured by crimping or squeezing the end to provide head 86.

Thermostat assembly 106 is assembled with retainer 108 such that head 148 at open end 128 of housing 126 abuts shoulder 124 of collar 122, and the entire subassembly is forced into nipple portion 92 of insert member 90 until clips 110 and 112 snap into register groove 102. Since the inner diameter of nipple portion 92 is less than the diametric distance between clips 110 and 112 retainer 108 is squeezed as it is forced into insert member 90 and springs into position once clips 110 and 112 are moved past shoulder 104.

Of course, it will be appreciated that the assembly steps described above may take any desired sequence. That is, thermostat assembly 106 and retainer 108 may be assembled with insert member 90 prior to screwing the insert member into casing 12 such that insert member 90, thermostat assembly 106 and retainer 108 may be secured in casing 12 simultaneously. Thermostat assembly 106 is calibrated by crimping sealed end 130 once valve 10 is assembled, as shown at 154.

Thus, it may be seen that material and assembly costs for valve 10 are materially reduced since a standard commercially available pipe Tee is utilized for the casing and no intricate assembly is required within the casing. That is, the valve member and thermostat subassemblies are assembled prior to insertion in the casing, and the thermostat subassembly is accurately aligned with respect to the valve member and the valve seat since register groove 102 and shoulder 104 accurately position retainer 108. Accordingly, actuating end 144 of plunger 142 is precisely spaced from the bottom of valve disc 60. Furthermore, the use of spring retaining cups 34 and 34' accurately align bias spring 36 with valve stem 52 to center the load on valve member 62 and provide more precise valve seating. The use of retaining cup 34' also simplifies the structure of valve member 62 in that plate 64 need not be precisely formed to center bias spring 36.

In operation, housing 126 extends into the water in the water heater to sense the temperature thereof. The space between actuating end 144 of plunger 142 and the bottom of valve disc 60 permits expansion and contraction of plastic material 134 within the normal operating temperature range; however, if the temperature exceeds the predetermined high limit value, plastic material 134 will expand sufficiently to cause the movable end thereof to displace plunger 142 against the force of spring 146 to close the space between actuating end 144 and valve disc 60 as shown in FIG. 4. Spacer 140 will push plunger 142 such that actuating end 144 moves valve member 62 away from valve seat 68 against the force of bias spring 36 to permit the discharge of hot water and steam through inlet port 16 and outlet port 14 of casing 12 to reduce the temperature of the water and prevent hazardous conditions from developing. The relative movement of valve member 62 with respect to valve stem 52 is limited by the abutting of the bottom of head 54 against the bottom of cavity 56. Once the temperature sensed by the thermostat assembly drops below the high limit value, plastic material 134 will contract to lower plunger 142 and permit valve member 62 to engage valve seat 68 under the force from bias spring 36 to stop flow through the casing.

Silicone plug 136 has a smaller diameter than housing 126 such that any water trapped around plastic material 134 is permitted to escape when the plastic material expands. When the plastic material senses the predetermined high limit temperature, plug 136 swells to prevent extrusion of the plastic material, and similarly washer 138 prevents extrusion of plug 136 past the piston-like head of spacer 140 at elevated temperatures. Bias spring 146 maintains a light compressive force on the piston-like head of plunger 142, spacer 140, washer 138 and plug 136 to keep them in place. The loose coupling between valve stem 52 and valve member 62 permits movement of the valve member relative to the valve stem to provide self alignment and assure effective valve seating.

If pressure in the water heater increases to the predetermined high limit value as set by adjustment of plug 22, the upstream pressure on valve member 62 will be greater than the downstream pressure as determined by the force from spring 36, and valve member 62 will be moved upwards against the force of spring 36 to thereby open the valve and permit hot water and steam to escape through inlet port 16 and outlet port 14 to reduce the pressure in the water heater, in the same manner as described above with respect to temperature relief. When the pressure in the water heater decreases below the high limit value, the force from spring 36 will move valve member 62 against valve seat 68 to close the valve and stop flow through casing 12.

If it is desired to manually open the pressure and temperature relief valve 10 due to malfunction thereof or for any other reason, lever 72 is pivoted upwards onto side wall 80, as illustrated in FIG. 5, to pull valve stem 52 up and move valve member 62 away from valve seat 68 once the lost motion of the coupling of head 54 in cavity 56 is overcome. Slot 88 accommodates head 86 and valve stem 52 so as not to impede pivotal movement of lever 72, and movement to the manual relief position may be maintained due to the transverse positioning of side wall 80 and the use of the ball and swivel arrangement. The ball and swivel arrangement also permits loose attachment of the valve stem to assure that valve member 62 is not restricted from properly seating on valve seat 68.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A pressure and temperature relief valve comprising an integral casing having first port, a second port axially aligned with said first port, a third outlet port, and a single chamber communicating with said ports;

insert means secured in said second port, said insert means defining an inlet to said casing and including a wall extending into said chamber to define a valve seat and an inner surface defining register means;

a valve member cooperating with said valve seat to control flow between said second port and said third outlet port;

a thermostat assembly including temperature sensing means and actuator means controlled by said temperature sensing means for engaging said valve member to move said valve member away from said valve seat when said temperature sensing means senses a predetermined high limit temperature;

retainer means holding said thermostat assembly and including clip means engaged with said register means to align said thermostat assembly with said valve seat and said valve member;

an adjustment plug secured in said first port;

valve stem means loosely attached to said valve member and having an external end extending through said adjustment plug;

manual lever assembly means engaging said external end of said valve stem means to permit manual opening of said pressure and temperature relief valve, said manual lever assembly including a lever having a spherical recess therein, and a swivel ball disposed in said recess and having a central bore therethrough, said valve stem extending through said bore and having an enlarged head captured by said swivel ball;

a first spring retaining cup having a first bottom portion with a first aperture centrally disposed therein and an integral first side wall forming a first helical shoulder and a first stop, said first bottom portion engaging said adjustment plug with said valve stem means extending through said first aperture;

a second spring retaining cup having a second bottom portion with second aperture centrally disposed therein and an integral second side wall forming a second helical shoulder and a second stop, said second bottom portion engaging said valve member with said valve stem means extending through said second aperture; and a helical bias spring having a first end received in said first retaining cup to abut said first stop and engage said first helical shoulder and a second end received in said second retaining cup to abut said second stop and engage said second helical shoulder such that said helical bias spring is mounted in compression between said adjustment plug and said valve member whereby said helical bias spring is axially aligned with said valve stem.

2. The invention as recited in claim 1 wherein said first spring retaining cup has a first external annular rib on said first bottom portion and said second spring retaining cup has a second external annular rib on said second bottom portion thereof.

3. The invention as recited in claim 1 wherein said valve member includes a valve disc with a neck portion extending therefrom and having a cavity therein, said valve stem means has an enlarged head captured in said cavity, and said neck portion extends loosely through said first aperture in said first spring retaining cup.

4. The invention as recited in claim 3 wherein said lever has a bottom wall normally abutting said adjustment plug to permit normal operation of said pressure and temperature relief valve and a transverse side wall adapted to abut said adjacent plug to open said pressure and temperature relief valve.

5. The invention as recited in claim 1 wherein said thermostat assembly includes a tubular housing having an enlarged open end forming a guide for said actuator means, and said retainer means includes a collar holding said tubular housing, said collar having an upper shoulder abutting said enlarged open end.

6. The invention as recited in claim 5 wherein said temperature sensing means is polyethylene.

7. The invention as recited in claim 1 wherein said second port is internally threaded, said insert means has an externally threaded shank threadedly engaging said inlet port, and said wall is frusto-conical and extends inwardly from said shank.

8. The invention as recited in claim 7 wherein said insert means is a single member defining said wall, said shank and an extremely threaded nipple portion adopted to be connected with a water heater.

9. A pressure and temperature relief valve comprising casing means having first and second axially aligned ports, an outlet port and a single chamber in communication with said ports;

insert means secured in said first port, said insert means defining an inlet and including register means and a wall forming a valve seat within said chamber and an inner surface defining register means;

a valve member cooperating with said valve seat to control flow between said first port and said outlet port;

a thermostat assembly including temperature sensing means, actuator means for engaging said valve member and movable to control the position thereof with respect to said valve seat in response to temperature variations, and a tubular housing having an enlarged open end forming a guide for said actuator means, said actuator means being controlled by said temperature sensing means to move said valve member away from said valve seat when a predetermined high limit temperature is sensed by said temperature sensing means;

retainer means for holding said thermostat assembly and including clip means engaged with said register means to position said retainer means in said insert means in alignment with said valve seat and said valve member, and a collar holding said tubular housing, said collar having an upper shoulder abutting said enlarged open end;

an adjustment plug means adjustably secured in said second port;

a helical bias spring mounted in compression between said adjustment plug means and said valve member to supply a predetermined force to said valve member in the direction of said valve seat; and a retaining cup on each end of said bias spring, each said retaining cup having a bottom portion and an integral side wall forming a helical shoulder and a stop, said bias spring being received in said retaining cups to abut said stops and engage said helical shoulders with said bottom portions engaging said valve member and said plug means whereby said bias spring is aligned with said valve member;

a manual lever assembly external of said casing adjacent said adjustment plug means, said manual lever assembly including a lever having a spherical recess therein, and a swivel ball disposed in said recess and having a central bore therethrough; and a valve stem loosely attached to said valve member and extending through said retaining cups and said adjustment plug means to said manual lever assembly, said valve stem extending through said bore and having an enlarged head captured by said swivel ball.

* * * * *